Figure 1:
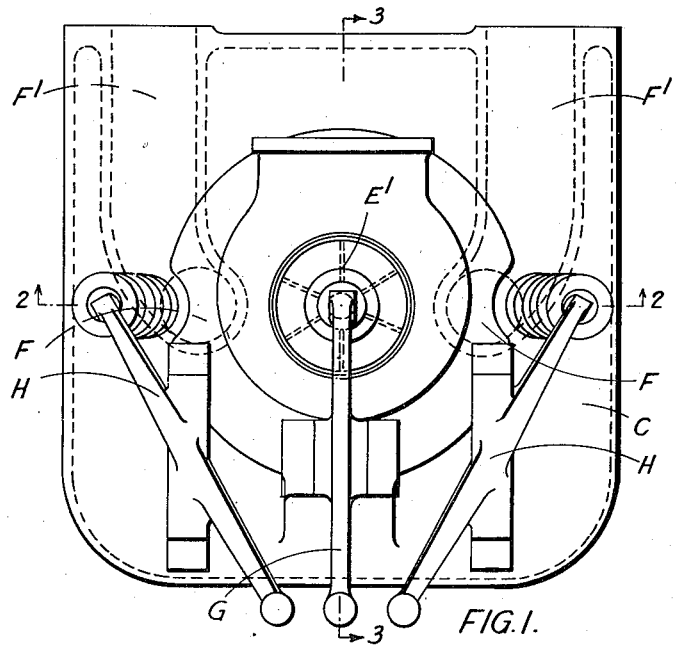

March 12, 1929.   H. R. RICARDO   1,705,374
INTERNAL COMBUSTION ENGINE
Filed April 13, 1928   2 Sheets-Sheet 1

INVENTOR
H. R. Ricardo
By Watson, Coit, Morse & Grindle
ATT'YS

March 12, 1929.  H. R. RICARDO  1,705,374
INTERNAL COMBUSTION ENGINE
Filed April 13, 1928  2 Sheets-Sheet 2

INVENTOR
Harry Ralph Ricardo
By Watson, Coit, Morse & Grindle
ATTYs

Patented Mar. 12, 1929.

1,705,374

UNITED STATES PATENT OFFICE.

HARRY RALPH RICARDO, OF LONDON, ENGLAND.

INTERNAL-COMBUSTION ENGINE.

Application filed April 13, 1928, Serial No. 269,763, and in Great Britain May 2, 1927.

This invention relates to internal combustion engines of the kind forming the subject of the present applicant's prior Letters Patent of the United States of America No. 1,622,885, dated 29th March 1927. In the internal combustion engine forming the subject of the above prior Letters Patent of the United States of America, the combustion chamber, which is of substantially circular cross-section in a plane at right angles to the cylinder axis, is disposed in the cylinder head and has a diameter where it opens into the cylinder which is less than that of the cylinder bore, while one or more fuel injection devices are disposed a substantial distance from the axis of the combustion chamber and are each adapted to deliver into the charge, to which is imparted a rotational motion about the combustion chamber axis, a fuel spray the mean direction of which is either parallel to or has a substantial component in a direction parallel to the axis of the combustion chamber.

The object of the present invention is to provide an improved construction of internal combustion engine of the kind forming the subject of the prior Letters Patent of the United States of America above referred to.

According to the present invention a single valve of the poppet type serving as an inlet or scavenging valve controls a port in the end wall of the combustion chamber opposite to the piston while means are provided whereby the charge entering the combustion chamber through this port is caused to assume a rotary motion about the axis of the valve prior to its entrance into the combustion chamber so that on entering the combustion chamber the charge tends to rotate substantially about the axis thereof. Preferably one or more valves are provided controlling exhaust ports formed in the annular portion of the cylinder head surrounding the combustion chamber. Further, in some cases the combustion chamber may be located somewhat eccentrically with respect to the cylinder so as to give more room for such exhaust valves.

In a convenient form the inlet passage is provided behind the valve with one or more guide vanes which tend to impart the rotational motion to the incoming charge, these guide vanes being, for example, formed on or carried by either the stem of the inlet valve itself or a member constituting a guide for the stem of this valve. Alternatively, however, the inlet passage may lead to the inlet port tangentially with respect thereto so as to cause the desired rotational motion of the incoming charge. In either case the inlet valve is preferably disposed substantially coaxially with respect to the combustion chamber but may be arranged somewhat eccentrically therein if desired in order to allow more room for the fuel injection device, when, as is preferred, the inlet valve is of large diameter.

The fuel is conveniently injected by one or more fuel sprayers disposed in the end wall of the combustion chamber adjacent to the circumference thereof, each of these sprayers delivering a fuel jet in a direction which is either parallel to or has a substantial component in a direction parallel to the axis of the combustion chamber.

If desired the inlet or scavenging valve may be provided or formed with a projection extending into the combustion chamber and serving to displace a part of the charge from the centre towards the circumference thereof where it is more readily reached by the fuel jet or jets.

The combustion chamber may be of various forms having a circular cross-section in a plane at right angles to the cylinder axis and a diameter where it opens into the cylinder which is less than that of the cylinder bore. For example, the combustion chamber may be of substantially cylindrical form or may have a smaller diameter towards the end adjacent to the piston than towards its closed end. Further, in some cases an uncooled liner may be provided in the combustion chamber to facilitate ignition.

The invention may be applied to engines operating on either the two-stroke or the four-stroke cycle, the scavenging valve in the case of a two-stroke internal combustion engine being located in the end of the combustion chamber while the exhaust takes place through one or more exhaust ports formed in the wall of the cylinder and adapted to be uncovered by the piston towards the end of its outstroke in the known manner.

The invention may be carried into practice in various ways, but one construction according to this invention is illustrated by way of example in the accompanying drawings, in which—

Figure 2:
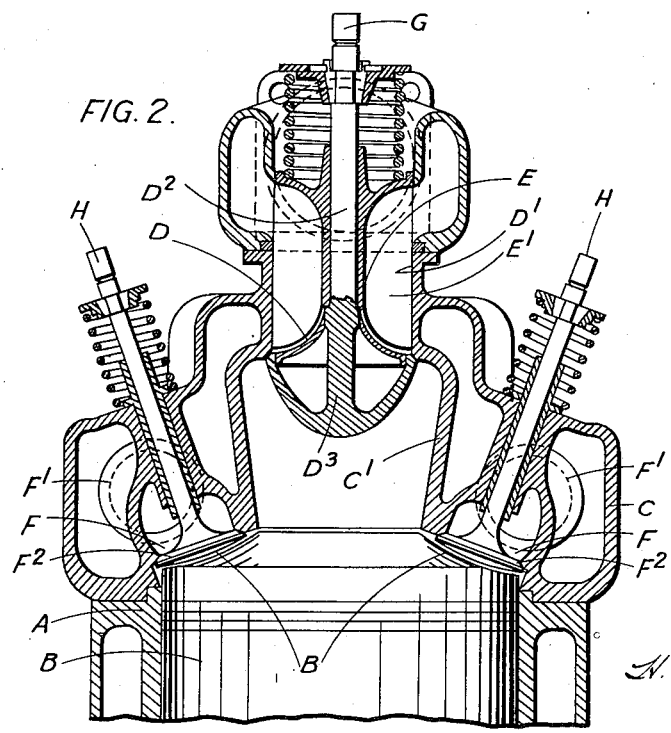
Figure 3:
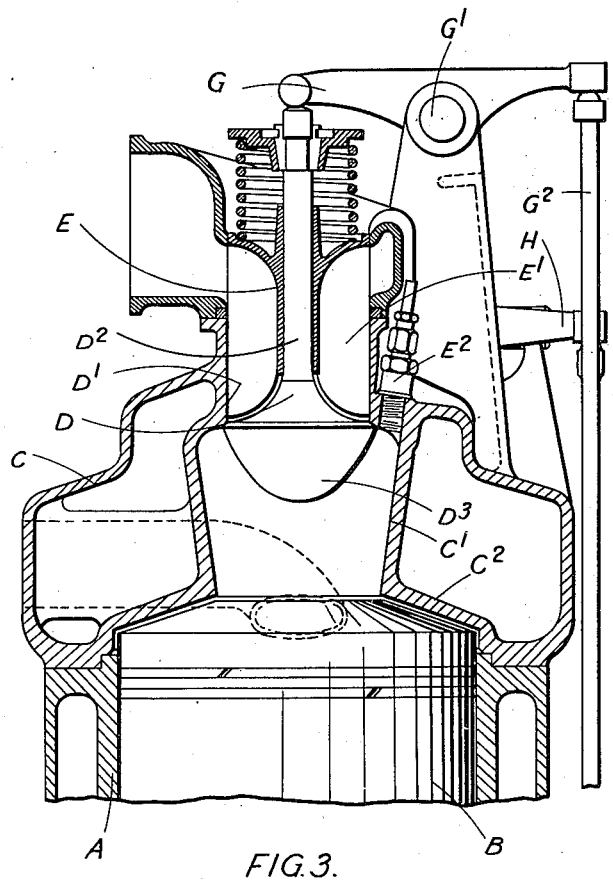
Figure 4:
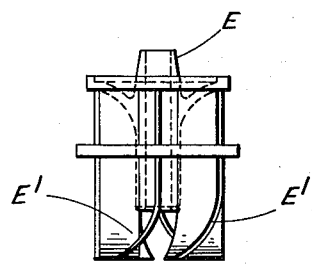

Figure 1 is a plan of the cylinder head of an engine according to this invention, Figure 2 is a section on the line 2—2 of Figure 1 showing the upper end of the cylinder and the cylinder head, Figure 3 is a section on the line 3—3 of Figure 1; and Figure 4 is a side elevation of the member serving to cause the whirling motion of the charge drawn into the combustion chamber.

In the construction illustrated an open-ended cylinder A of the water cooled type has a piston B disposed within it. The cylinder A is closed at its open end by a cylinder head C also water cooled and containing a combustion chamber $C^1$ of substantially circular cross-section in a plane at right angles to the longitudinal axis of the cylinder, this combustion chamber having a diameter where it opens into the cylinder which is less than that of the cylinder bore. The combustion chamber $C^1$ is conveniently, as shown, substantially straight sided in elevation and tapered so that its diameter towards its end remote from the piston B is somewhat greater than that towards the end which lies adjacent to the piston. The mean diameter of the combustion chamber may vary but in the form shown is approximately half that of the cylinder bore.

Controlling an inlet port formed substantially centrally in the outer or closed end wall of the combustion chamber $C^1$ and communicating with an inlet passage $D^1$ is a valve D, the diameter of which may be, for example, as shown, about three-quarters of that of the outer end of the combustion chamber. Disposed in the inlet passage $D^1$ is a member E serving as a guide for the stem $D^2$ of the inlet valve D and provided with a series of curved guide vanes $E^1$ so formed as to tend to impart to the incoming charge a whirling motion about the axis of the valve so that the charge on entering the combustion chamber tends to rotate about the axis thereof. The valve D itself may be provided, as shown, with a dome-like head $D^3$ which extends into the central portion of the combustion chamber so as to displace some of the charge towards the circumferential portions thereof.

Arranged in the end wall of the combustion chamber adjacent to the edge of the inlet port is a fuel injection sprayer $E^2$ adapted to deliver a jet of fuel in a direction either parallel to or making a small angle with the axis of the combustion chamber. For example, with the somewhat tapered form of combustion chamber shown, the axis of the spray may be substantially parallel to that portion of the wall of the combustion chamber adjacent to which the fuel injection device lies. If desired, instead of a single sprayer as shown, two or more sprayers may be provided each disposed adjacent to the edge of the inlet port and adapted to deliver a jet of fuel in a direction either parallel to or making a small angle with the axis of the combustion chamber.

In either case, each fuel sprayer is preferably of the type adapted to deliver a single jet or cone of spray, but other types may be employed if desired. When a sprayer is employed delivering two or more jets of fuel however, the mean direction of such jets must have a substantial component in a direction parallel to the axis of the combustion chamber.

With a combustion chamber of the form shown, there is an annular portion $C^2$ of the cylinder head between the inner end of the combustion chamber where it opens into the cylinder proper and the wall of the cylinder, and in this portion of the cylinder head are formed one or more exhaust ports F communicating with exhaust passages $F^1$ and each controlled by an exhaust valve $F^2$ of the poppet type, the axes of these valves conveniently being inclined somewhat to the cylinder axis as shown. In the construction illustrated two such exhaust valves are provided but either a single exhaust valve or three or more such valves may be provided if desired.

The inlet valve is conveniently actuated by one end of a rocker G pivoted at $G^1$, the other end of which is engaged by a push rod $G^2$ while the exhaust valves are similarly operated by rockers H.

The stroke of the piston B is preferably so proportioned that substantially the whole of the gaseous charge is compressed into the combustion chamber at the end of the compression stroke and in order to allow this, portions $B^1$ of the piston face may be scooped out to clear the exhaust valves.

Further, in some cases instead of the vanes for causing rotation of the incoming charge being formed on a member serving also as a guide for the inlet stem as shown, these vanes may be formed on or carried by the valve itself. In such an arrangement for example, the vanes may be formed integral with the valve head and the adjacent part of the valve stem, the valve guide being only of such length as not to come into contact with the vane-carrying part of the stem. It is to be understood, however, that the invention is not limited to the use of vanes for causing the rotation of the incoming charge about the axis of the valve prior to its entrance into the combustion chamber, but that other arrangements may be employed without departing from this invention. For example, the gaseous charge may be led tangentially into the inlet passage in order to cause the desired rotational motion of the incoming charge.

Although the invention has been described with particular reference to engines operating on the four-stroke cycle, it may be applied to engines operating on the two-stroke cycle, and in this case a construction similar to that illustrated may be employed except that the exhaust valves are omitted and exhaust ports are formed in the cylinder wall where they will be uncovered by the piston towards the end of its outstroke.

It will be seen that with an engine such as that described above with reference to the drawings, a rotary motion about the combustion chamber axis will be imparted to the gaseous charge by the guide vanes in the inlet passage, the fuel being injected into this charge so that the rotational motion brings substantially the whole of the gaseous charge into contact with the fuel.

What I claim as my invention and desire to secure by Letters Patent is:—

1. An internal combustion engine of the liquid fuel injection type including in combination a cylinder, a cylinder head, a piston reciprocating within the cylinder, a combustion chamber in the cylinder head of substantially circular cross-section in a plane at right angles to the axis of the cylinder, the diameter of the combustion chamber where it opens into the cylinder being less than that of the cylinder bore, a single valve of the poppet type serving as an inlet valve controlling a port in the end wall of the combustion chamber opposite to the piston, means whereby the charge entering the combustion chamber through such port is caused to assume a rotary motion about the axis of the valve prior to its entrance into the combustion chamber and at least one fuel injection device disposed a substantial distance from the axis of the combustion chamber and adapted to deliver a spray the mean direction of which has a substantial component in a direction parallel to the axis of the combustion chamber.

2. An internal combustion engine of the liquid fuel injection type including in combination a cylinder, a cylinder head, a piston reciprocating within the cylinder, a combustion chamber in the cylinder head of substantially circular cross-section in a plane at right angles to the axis of the cylinder, the diameter of the combustion chamber where it opens into the cylinder being less than that of the cylinder bore, a single valve of the poppet type serving as an inlet valve controlling a port in the end wall of the combustion chamber opposite to the piston, means whereby th charge entering the combustion chamber through such port is caused to assume a rotary motion about the axis of the valve prior to its entrance into the combustion chamber, at least one fuel injection device disposed a substantial distance from the axis of the combustion chamber and adapted to deliver a spray the mean direction of which has a substantial component in a direction parallel to the axis of the combustion chamber, and at least one exhaust valve controlling an exhaust port formed in the annular portion of the cylinder head surrounding the combustion chamber.

3. An internal combustion engine of the liquid fuel injection type including in combination a cylinder, a cylinder head, a piston reciprocating within the cylinder, a combustion chamber in the cylinder head of substantially circular cross-section in a plane at right angles to the axis of the cylinder, the diameter of the combustion chamber where it opens into the cylinder being less than that of the cylinder bore, a single valve of the poppet type serving as an inlet valve controlling a port in the end wall of the combustion chamber opposite to the piston, guide vanes in the inlet passage whereby the charge entering the combustion chamber through the inlet port is caused to assume a rotary motion about the axis of the valve prior to its entrance into the combustion chamber, and at least one fuel injection device disposed a substantial distance from the axis of the combustion chamber and adapted to deliver a spray the mean direction of which has a substantial component in a direction parallel to the axis of the combustion chamber.

4. An internal combustion engine of the liquid fuel injection type including in combination a cylinder, a cylinder head, a piston reciprocating within the cylinder, a combuston chamber in the cylinder head of substantially circular cross-section in a plane at right angles to the axis of the cylinder, the diameter of the combustion chamber where it opens into the cylinder being less than that of the cylinder bore, a single valve of the poppet type serving as an inlet valve controlling a port in the end wall of the combustion chamber opposite to the piston, guide vanes in the inlet passage whereby the charge entering the combustion chamber through the inlet port is caused to assume a rotary motion about the axis of the valve prior to its entrance into the combustion chamber, at least one fuel injection device disposed a substantial distance from the axis of the combustion chamber and adapted to deliver a spray the mean direction of which has a substantial component in a direction parallel to the axis of the combustion chamber and at least one exhaust valve controlling an exhaust port formed in the annular portion of the cylinder head surrounding the combustion chamber.

5. An internal combustion engine of the liquid fuel injection type including in combination a cylinder, a cylinder head, a piston reciprocating within the cylinder, a combustion chamber in the cylinder head of substantially circular cross-section in a plane at right angles to the axis of the cylinder, the diameter of the combustion chamber where it opens into the cylinder being less than that of the cylinder bore, a single valve of the poppet type serving as an inlet valve controlling a port in the end wall of the combustion chamber opposite to the piston, a guide for the valve stem having guide vanes formed thereon whereby the charge entering the combustion chamber through the inlet port is caused to assume a rotary motion about the axis of the valve prior to its entrance into the combustion chamber and at least one fuel injection device disposed a substantial distance from the axis of the combustion chamber and adapted to deliver a spray the mean direction of which has a substantial component in a direction parallel to the axis of the combustion chamber.

6. An internal combustion engine of the liquid fuel injection type including in combination a cylinder, a cylinder head, a piston reciprocating within the cylinder, a combustion chamber in the cylinder head of substantially circular cross-section in a plane at right angles to the axis of the cylinder, the diameter of the combustion chamber where it opens into the cylinder being less than that of the cylinder bore, a single valve of the poppet type serving as an inlet valve controlling a port in the end wall of the combustion chamber opposite to the piston, a guide for the valve stem having guide vanes formed thereon whereby the charge entering the combustion chamber through the inlet port is caused to assume a rotary motion about the axis of the valve prior to its entrance into the combustion chamber, at least one fuel injection device disposed a substantial distance from the axis of the combustion chamber and adapted to deliver a spray the mean direction of which has a substantial component in a direction parallel to the axis of the combustion chamber, and at least one exhaust valve controlling an exhaust port formed in the annular portion of the cylinder head surrounding the combustion chamber.

7. An internal combustion engine of the liquid fuel injection type including in combination, a cylinder, a cylinder head, a piston reciprocating within the cylinder, a combustion chamber in the cylinder head of substantially circular cross-section in a plane at right angles to the axis of the cylinder, the diameter of the combustion chamber where it opens into the cylinder being less than that of the cylinder bore, a single valve of the poppet type serving as an inlet valve controlling a port in the end wall of the combustion chamber opposite to the piston, means whereby the charge entering the combustion chamber through such port is caused to assume a rotary motion about the axis of the valve prior to its entrance into the combustion chamber, a projection on the valve head extending into the combustion chamber and serving to displace a part of the charge from the centre towards the circumference thereof, and at least one fuel injection device disposed a substantial distance from the axis of the combustion chamber and adapted to deliver a spray the mean direction of which has a substantial component in a direction parallel to the axis of the combustion chamber.

8. An internal combustion engine of the liquid fuel injection type including in combination a cylinder, a cylinder head, a piston reciprocating within the cylinder, a combustion chamber in the cylinder head of substantially circular cross-section in a plane at right angles to the axis of the cylinder and having substantially straight sides in sectional elevation, the diameter of the combustion chamber where it opens into the cylinder being less than that of the cylinder bore, a single valve of the poppet type serving as an inlet valve controlling a port in the end wall of the combustion chamber opposite to the piston, means whereby the charge entering the combustion chamber through such port is caused to assume a rotary motion about the axis of the valve prior to its entrance into the combustion chamber and at least one fuel injection device disposed a substantial distance from the axis of the combustion chamber and adapted to deliver a spray the mean direction of which has a substantial component in a direction parallel to the axis of the combustion chamber.

9. An internal combustion engine of the liquid fuel injection type including in combination a cylinder, a cylinder head, a piston reciprocating within the cylinder, a combustion chamber in the cylinder head of substantially circular cross-section in a plane at right angles to the axis of the cylinder, the diameter of the combustion chamber being less towards the end adjacent the piston than towards its closed end and less as a whole than the diameter of the cylinder bore, a single valve of the poppet type serving as an inlet valve controlling a port in the end wall of the combustion chamber opposite to the piston, means whereby the charge entering the combustion chamber through such port is caused to assume a rotary motion about the axis of the valve prior to its entrance into the combustion chamber and at least one fuel injection device disposed a substantial distance from the axis of the combustion chamber and adapted to deliver a spray the mean direction of which has a substantial component in a direction parallel to the axis of the combustion chamber.

10. An internal combustion engine of the liquid fuel injection type including in combination a cylinder, a cylinder head, a piston reciprocating within the cylinder, a combustion chamber in the cylinder head of substantially circular cross-section in a plane at right angles to the axis of the cylinder and having substantially straight sides in sectional elevation, the diameter of the combustion chamber where it opens into the cylinder being less than that of the cylinder bore, a single valve of the poppet type serving as an inlet valve controlling a port in the end wall of the combustion chamber opposite to the piston, guide vanes in the inlet passage whereby the charge entering the combustion chamber through such port is caused to assume a rotary motion about the axis of the valve prior to its entrance into the combustion chamber and at least one fuel injection device disposed a substantial distance from the axis of the combustion chamber and adapted to deliver a spray the mean direction of which has a substantial component in a direction parallel to the axis of the combustion chamber.

11. An internal combustion engine of the liquid fuel injection type including in combination a cylinder, a cylinder head, a piston reciprocating within the cylinder, a combustion chamber in the cylinder head of substantially circular cross-section in a plane at right angles to the axis of the cylinder and having substantially straight sides in sectional elevation, the diameter of the combustion chamber where it opens into the cylinder being less than that of the cylinder bore, a single valve of the poppet type serving as an inlet valve controlling a port in the end wall of the combustion chamber opposite to the piston, a guide for the valve stem having guide vanes formed thereon whereby the charge entering the combustion chamber through such port is caused to assume a rotary motion about the axis of the valve prior to its entrance into the combustion chamber and at least one fuel injection device disposed a substantial distance from the axis of the combustion chamber and adapted to deliver a spray the mean direction of which has a substantial component in a direction parallel to the axis of the combustion chamber.

12. An internal combustion engine of the liquid fuel injection type including in combination a cylinder, a cylinder head, a piston reciprocating within the cylinder, a combustion chamber in the cylinder head of substantially circular cross-section in a plane at right angles to the axis of the cylinder and having substantially straight sides in sectional elevation, the diameter of the combustion chamber where it opens into the cylinder being less than that of the cylinder bore, a single valve of the poppet type serving as an inlet valve controlling a port in the end wall of the combustion chamber opposite to the piston, means whereby the charge entering the combustion chamber through such port is caused to assume a rotary motion about the axis of the valve prior to its entrance into the combustion chamber, a projection on the valve head extending into the combustion chamber and serving to displace a part of the charge from the centre towards the circumference thereof and at least one fuel injection device disposed a substantial distance from the axis of the combustion chamber and adapted to deliver a spray the mean direction of which has a substantial component in a direction parallel to the axis of the combustion chamber.

13. An internal combustion engine of the liquid fuel injection type including in combination a cylinder, a cylinder head, a piston reciprocating within the cylinder, a combustion chamber in the cylinder head of substantially circular cross-section in a plane at right angles to the axis of the cylinder and having substantially straight sides in sectional elevation, the diameter of the cumbustion chamber where it opens into the cylinder being less than that of the cylinder bore, a single valve of the poppet type serving as an inlet valve controlling a port in the end wall of the combustion chamber opposite to the piston, guide vanes in the inlet passage whereby the charge entering the combustion chamber through the inlet port is caused to assume a rotary motion about the axis of the valve prior to its entrance into the combustion chamber, at least one fuel injection device disposed a substantial distance from the axis of the combustion chamber and adapted to deliver a spray the mean direction of which has a substantial component in a direction parallel to the axis of the combustion chamber and at least one exhaust valve controlling an exhaust port formed in the annular portion of the cylinder head surrounding the combustion chamber.

14. An internal combustion engine of the liquid fuel injection type including in combination a cylinder, a cylinder head, a piston reciprocating within the cylinder, a combustion chamber in the cylinder head of substantially circular cross-section in a plane at right angles to the axis of the cylinder and having substantially straight sides in sectional elevation, the diameter of the combustion chamber where it opens into the cylinder being less than that of the cylinder bore, a single valve of the poppet type serving as an inlet valve controlling a port in the end wall of the combustion chamber opposite to the piston, guide vanes in the inlet passage whereby the charge entering the combustion chamber through the inlet port is caused to assume a rotary motion about the axis of the valve prior to its entrance into the combustion chamber, at least one fuel injection device disposed a substantial distance from the axis of the combustion chamber and adapted to deliver a spray the mean direction of which has a substantial component in a direction parallel to the axis of the combustion chamber, a projection on the inlet valve head extending into the combustion chamber and serving to displace a part of the charge from the centre towards the circumference thereof and at least one exhaust valve controlling an exhaust port formed in the annular portion of the cylinder head surrounding the combustion chamber.

In testimony whereof I have signed my name to this specification.

HARRY RALPH RICARDO.